(12) United States Patent
Strulo et al.

(10) Patent No.: US 10,355,974 B2
(45) Date of Patent: Jul. 16, 2019

(54) ADMISSION CONTROL IN A PACKET NETWORK

(75) Inventors: Ben Strulo, Felixstowe (GB); Marc Wennick, Ipswich (GB); Gabriele Corliano, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1235 days.

(21) Appl. No.: 12/935,389

(22) PCT Filed: Mar. 27, 2009

(86) PCT No.: PCT/GB2009/000827
§ 371 (c)(1),
(2), (4) Date: Sep. 29, 2010

(87) PCT Pub. No.: WO2009/122150
PCT Pub. Date: Oct. 8, 2009

(65) Prior Publication Data
US 2011/0019549 A1    Jan. 27, 2011

(30) Foreign Application Priority Data
Mar. 31, 2008 (EP) .................................... 0825265

(51) Int. Cl.
*H04L 12/729* (2013.01)
*H04L 12/721* (2013.01)
(Continued)

(52) U.S. Cl.
CPC .......... *H04L 45/125* (2013.01); *H04L 45/123* (2013.01); *H04L 45/38* (2013.01);
(Continued)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS

| 6,175,870 B1 | 1/2001 | Gawlick et al. |
| 6,778,496 B1 | 8/2004 | Meempat et al. |

(Continued)

FOREIGN PATENT DOCUMENTS

| EP | 0 777 362 | 6/1997 |
| EP | 1 758 320 | 2/2007 |
| WO | 2006/079783 | 8/2006 |

OTHER PUBLICATIONS

Written Opinion of the International Searching Authority (3 pgs.) issued in International Application No. PCT/GB2009/000827.
(Continued)

*Primary Examiner* — Un C Cho
*Assistant Examiner* — Kenan Cehic
(74) *Attorney, Agent, or Firm* — Nixon & Vanderhye PC (57) ABSTRACT

In embodiments of the invention when a session request is received the value assigned to that session is compared to present congestion costs in the network at the present time. If the value of the session exceeds the cost then the session is accepted; otherwise it is rejected. It is possible to show mathematically that, provided this strategy is used for all session requests, then, when demand exceeds supply for a given resource, the congestion measurement for that resource rises to become equal to its shadow price. Here, in a model of a capacity constrained network, the shadow price of a capacity constraint is the cost to other users of using one unit of capacity. Congestion measurements can therefore be used to provide a "cost" (to other users) of admitting the flow to the network, which can then be compared against the (Continued)

"value" (to the network operator) of admitting the flow during the admission control evaluation. Additionally, this "cost" vs. "value" comparison can be used for path selection, as well as any other resource management decision. For example, in particularly preferred embodiments a session is not only admitted based upon the cost value comparison, but is also assigned to a particular path which maximizes value minus cost.

19 Claims, 8 Drawing Sheets

(51) Int. Cl.
    *H04L 12/801*      (2013.01)
    *H04L 12/911*      (2013.01)
(52) U.S. Cl.
    CPC .............. *H04L 47/12* (2013.01); *H04L 47/15* (2013.01); *H04L 47/70* (2013.01); *Y02D 30/32* (2018.01)
(58) Field of Classification Search
    CPC ..... H04L 45/125; H04L 45/123; H04L 45/38; H04L 47/12; H04L 47/15
    USPC .................................................. 370/229–240
    See application file for complete search history.

(56) References Cited

U.S. PATENT DOCUMENTS

| | | | |
|---|---|---|---|
| 2002/0039349 A1* | 4/2002 | Malaney | H04L 12/5601 370/230.1 |
| 2002/0097716 A1* | 7/2002 | Kumaran | H04L 47/10 370/389 |
| 2002/0120768 A1 | 8/2002 | Kirby et al. | |
| 2003/0048750 A1 | 3/2003 | Kobayashi | |
| 2003/0058792 A1* | 3/2003 | Shao | H04L 47/115 370/229 |
| 2004/0033806 A1* | 2/2004 | Daniel | H04W 72/085 455/450 |
| 2004/0213265 A1* | 10/2004 | Oueslati | H04L 12/5601 370/395.42 |
| 2007/0041326 A1* | 2/2007 | Babiarz et al. | 370/237 |
| 2007/0047540 A1 | 3/2007 | Bragg et al. | |
| 2007/0091801 A1 | 4/2007 | Shahidi et al. | |
| 2007/0291643 A1* | 12/2007 | Charny et al. | 370/230 |
| 2008/0159129 A1 | 7/2008 | Songhurst et al. | |
| 2009/0207731 A1* | 8/2009 | Carlson et al. | 370/232 |
| 2011/0249554 A1* | 10/2011 | Chamas et al. | 370/230 |
| 2012/0033573 A1* | 2/2012 | Stanwood | H04W 28/24 370/252 |
| 2013/0051229 A1* | 2/2013 | Rabie et al. | 370/230 |

OTHER PUBLICATIONS

European Search Report (7 pgs.) dated Jul. 17, 2008 issued in European Application No. 08251265.8.
Eardley, P., "Pre-Congestion Notification Architecture", Internet Draft, Feb. 8, 2008, pp. 1-49.
Ramakrishnan, K., "The Addition of Explicit Congestion Notification (ECN) to IP", Sep. 2001, pp. 1-59.
International Search Report for PCT/GB2009/000827, dated Jul. 21, 2009.

* cited by examiner

ADMISSION CONTROL IN A PACKET NETWORK

This application is the U.S. national phase of International Application No. PCT/GB2009/000827 filed 27 Mar. 2009, which designated the U.S. and claims priority to EP Application No. 08251265.8 filed 31 Mar. 2008, the entire contents of each of which are hereby incorporated by reference.

TECHNICAL FIELD

The present invention relates to a method and system for performing admission control in a packet network. In preferred embodiments, the present invention relates to an admission control and routing method and system wherein both admission control and route selection can be performed at the same time, based on information relating to the present loading of the network.

BACKGROUND TO THE INVENTION AND PRIOR ART

Internet protocol networks are handling increasing volumes of data, with the data being of different types. For example, potential high value Internet services, such as voice and video, generate mostly constant bit-rate, inelastic traffic which is difficult to adapt to a change in network environment. Such traffic competes for bandwidth with data transfers, such as email and the like, which are much more reactive to changing network conditions. When congestion occurs, all traffic to a congested node is affected, meaning that packets can then be lost at the node. The consequences of packet loss for a particular data stream can vary, depending on the type of the stream. For voice-over-IP (VoIP), telephony, and video applications, packet losses manifest themselves as artefacts in the received audio or video, such as the audio breaking up, or videos having the image freeze.

It has therefore long been known that to try and protect high value Internet services, such as voice and video, a quality of service (QoS) mechanism is required, to try and guarantee the level of network service to such high value streams. For example, the Differentiated Services (DiffServ) architecture allows packet streams to be distinguished amongst different classes, and for a different quality of service to be offered to each packet class. High value services such as voice-over-IP, video, and the like will be placed in a higher class with a higher quality of service than lower value services. The Internet protocol header contains the DiffServ code point (DSCP), to allow an IP datagram to be categorised into the particular classes for use with a DiffServ architecture.

Another technique which has been applied is to control admission of data flows into a network, so as to only admit a sufficient number of data flows for which the network has capacity. This is known as admission control. In this field, recently measurement-based admission control (MBAC) has been of interest. One particular MBAC solution is known as pre-congestion notification (PCN) which has been developed by the Congestion and Pre-congestion Notification working group of the Internet Engineering Taskforce. A description of the present status of PCN can be found at http://tools.ietf.org/html/draft-ietf-pcn-architecture-03.

Figure 1:
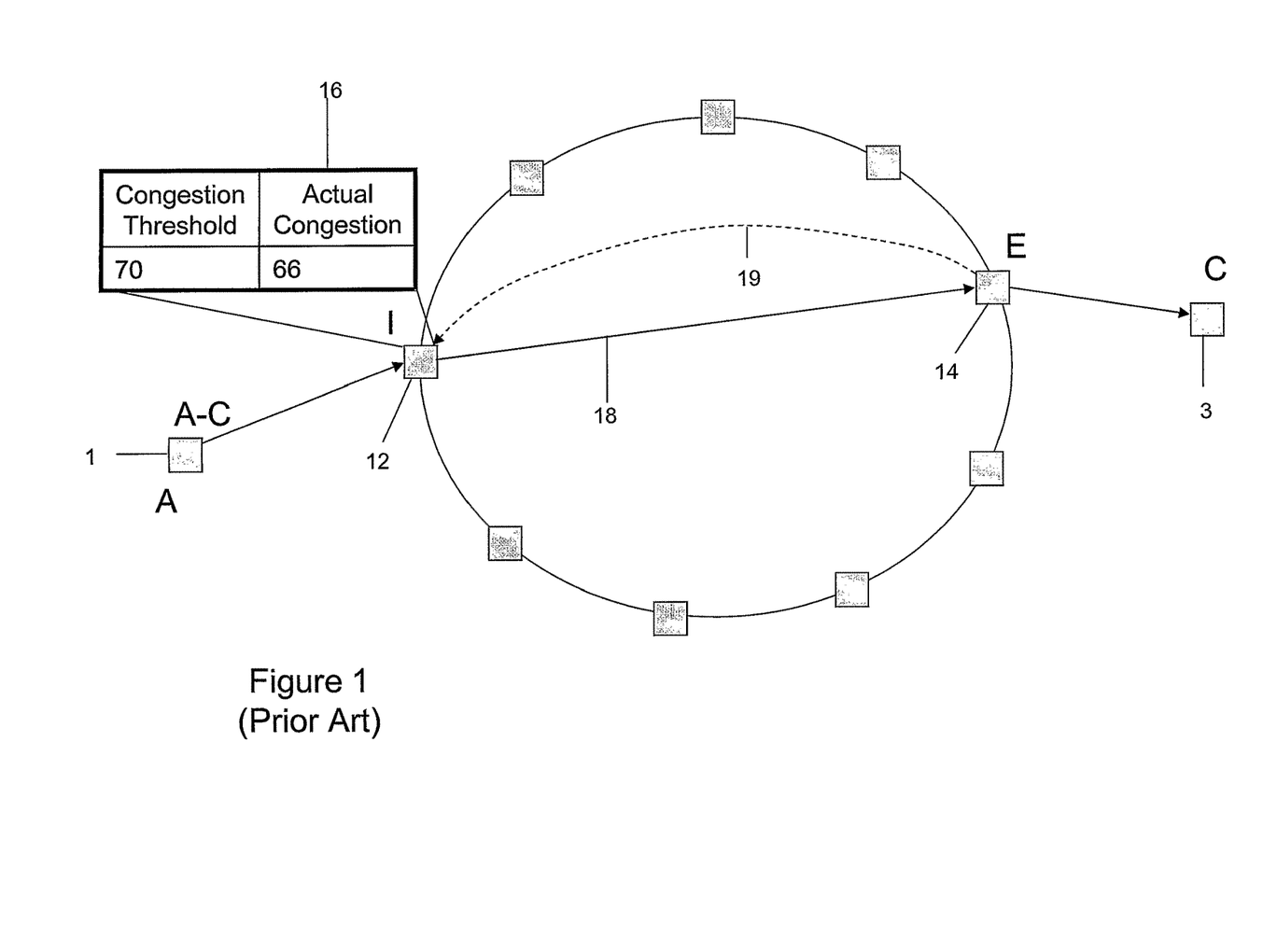
FIG. 1 is a diagram of an example measurement-based admission control arrangement of the prior art.

The basic idea of PCN is to control the admission of flows to a region of the network by means of a periodic measurement of the congestion level between two edges of that region. Congestion signals are propagated throughout the network towards egress nodes, as shown in FIG. 1. In particular, here it will be seen that as a flow 18 propagates from an ingress node 12 towards an egress node 14, congestion signals can be added to the flow 18 which are then measured at the egress node 14 and fed back to the ingress node 12. Explicit congestion notification (ECN), as described in IETF RFC 3168, is used to add congestion marks to the DiffServ code point of the IP packets on flow 18 so as to propagate a congestion notification signal downstream to the egress node. The egress node measures the receipt of congestion marks in the packets which it receives in the flow, and feeds back information as to the level of congestion on path 18 to the ingress node 12, as congestion information 19.

When a new flow arrives at ingress node 12 this node compares the current congestion level which has been experienced with a preconfigured threshold stored in table 16, and a new flow is admitted only when the actual congestion which has been experienced is lower than the preconfigured congestion threshold. With the values shown in table 16 of FIG. 1, a new flow would be admitted.

One of the problems with the prior art PCN mechanism is that it concentrates solely on admission control, and does not take into account the actual path that a flow takes through a network. For example, it may be that only a subset of paths through a network are in fact very heavily congested, with the remainder of the paths being only lightly congested. However, depending on the congestion thresholds chosen, and the congestion measurements used, the heavily congested paths may influence the overall congestion measurement to the extent that flows are rejected, even though there is in fact capacity on some of the paths. However, only by taking into account both path routing and admission control at the same time, can this problem be addressed.

Figure 2:
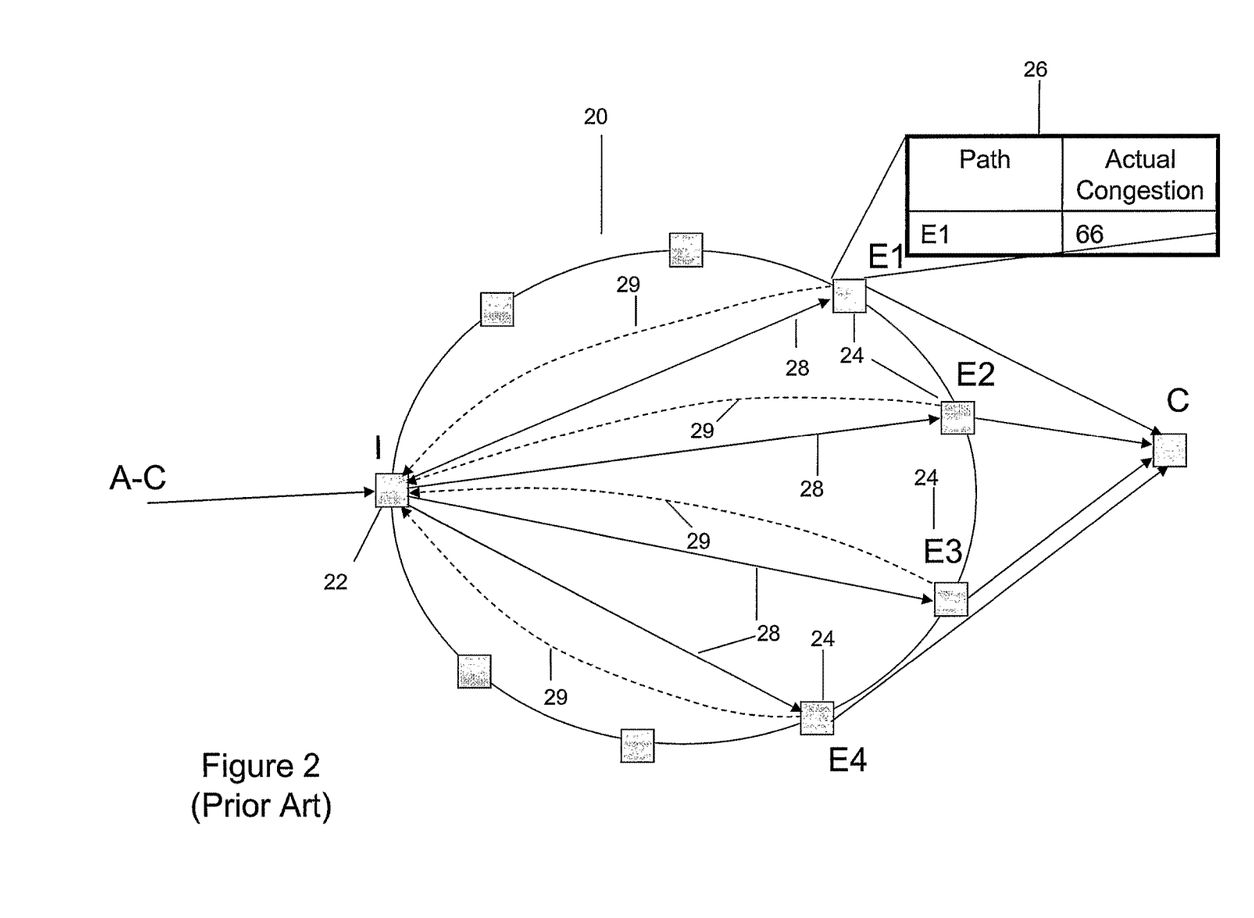
FIG. 2 is a diagram of another measurement-based admission control arrangement of the prior art.

One piece of prior art which performs admission control and routing simultaneously is U.S. Pat. No. 6,778,496 B, issued to Lucent. Within the Lucent patent, an admission control and load balancing technique is described which allows for congestion information to propagate from the ingress node of a network down to the egress node. The congestion information is in the form of a cost metric which is updated as the cost packet travels along the path. The cost metric packet is received at the egress gateways, and can be used for an admission control decision at the egress gateways by comparing the cost metric thus determined with a constant admission threshold, and admitting new flows into the network if the cost metric is less than the admission threshold. The admission control decision must then be communicated to the ingress nodes. FIG. 2 illustrates a simplified version of such a scheme. Here, cost metric packets (referred to in Lucent as "path utilisation status messages") propagate through the network from an ingress node to egress nodes, collecting cost information along the way. Admission control decisions can then be taken at the egress nodes by comparing the measured cost with the threshold. Additionally, path selection through the network can also be performed at the same time by selecting the most appropriate path based on the cost metrics thus found.

Whilst Lucent therefore integrates the admission control and multipath routing decision, it continues to have some drawbacks due to the particular implementation used. For example because Lucent depends upon a constant admission control threshold, the problem noted previously can still be found, that the threshold may be set incorrectly so as to cause some flows to be refused, when in fact they could be admitted. It would therefore be preferable for a further, more intelligent, admission control and multipath routing technique to be found which does not have the drawbacks of the use of fixed thresholds for admission control decisions.

US 2002/120768 in the name of Kirby et al relates to traffic flow management in a communications network. Admission of rapidly varying traffic flows to a communications network is controlled by sampling the traffic flows at an ingress, and sampling an aggregate flow of the flows at some or all of the resources used by the aggregate flow. From this sampling, a mean bandwidth requirement for each traffic flow and a measure of the variance from that mean are determined. First and second prices for the mean and variance components of the controlled traffic flows are calculated, and these are used to determine an admission cost for each flow so as to regulate the admission of that flow via a feedback price mechanism.

EP 0 777 362, also in the name of Lucent, relates to a method of admitting and routing switched virtual circuit (VC) requests in a network. The method first finds a set of routing paths on which a requested VC may be routed using a two-step process. The method uses a cost function based on a parameter related to the number of hops in a subset of VC connections previously made in the network to determine potential routing paths on which the VC can be routed at a cost below a specified threshold. The method next checks to determine which potential routing paths comprise links and nodes with sufficient resources to accommodate the request. Paths satisfying both steps are output as a set of routing paths and then a second criterion is used to select a path from the set on which to route the request.

SUMMARY OF THE INVENTION

In embodiments of the invention we implement admission control and path selection based on indications related to congestion, but instead of relying on a fixed congestion threshold, in embodiments of the present invention the concept of session "value" is introduced, which can then be compared to path congestion cost. More particularly, in embodiments of the present invention a value structure is first assigned to sessions to be admitted. This would typically, in preferred embodiments, be defined by the network operator. In particular, to each session the network operator assigns a particular value representing the value to the operator of accepting (instead of rejecting) a session. A different value can be applied for different types of sessions, or for different types of customers. The same type of session may be applied a different value at a different time. For example, a voice call which was an emergency call (e.g. to 999, or 911) could always be given a high value.

In embodiments of the invention when a session request is received the value assigned to that session is compared to present congestion costs in the network at the present time. If the value of the session exceeds the cost then the session is accepted; otherwise it is rejected. It is possible to show mathematically that, provided this strategy is used for all session requests, then, when demand exceeds supply for a given resource, the congestion measurement for that resource rises to become equal to its shadow price. Here, in a model of a capacity constrained network, the shadow price of a capacity constraint is the cost to other users of using one unit of capacity. Congestion measurements can therefore be used to provide a "cost" (to other users) of admitting the flow to the network, which can then be compared against the "value" (to the network operator) of admitting the flow during the admission control evaluation. Additionally, this "cost" vs. "value" comparison can be used for path selection, as well as any other resource management decision. For example, in particularly preferred embodiments a session is not only admitted based upon the cost value comparison, but is also assigned to a particular path which maximises value minus cost.

In view of the above, from a first aspect of the invention there is provided a method of operating a packet communications network, comprising the steps: maintaining, for different types of packet flows, a respective value measure for each type of flow representing the value to the network operator of admitting a flow of each type to the network; determining, for substantially each path across the network from an ingress node to an egress node, a congestion measure relating to congestion on the paths caused by existing admitted packet flows; and admitting a new packet flow to the network in dependence on the maintained value for the type of the new packet flow and the congestion measures determined for the paths across the network; wherein congestion information is passed downstream along a path towards an egress node, and the congestion measures are determined at an egress node by accumulating the congestion information passed along each path terminating at the egress node.

Thus, with the first aspect an admission control decision can be taken in a packet communications network based on the value of the flow to be admitted, taking into account the present congestion cost of existing flows in the network.

Preferably the accumulation comprises producing a moving average of the size of congested packets, and more preferably an exponentially weighted moving average.

In preferred embodiments the congestion measures are determined in dependence on congestion marks associated with packets in the packet flows, such as ECN or PCN marks.

In preferred embodiments the admitting step further comprises selecting a path on to which the new flow is to be admitted in dependence on the congestion measures determined for the paths across the network, whereby flow admission control and path selection are performed in the same operation. In these embodiments the admission control and path selection functions are integrated into a single operation. This allows for path selection also to be performed based on the value of the new flow to the network operator.

In one preferred embodiment the selecting step comprises selecting a path with the lowest congestion measure, and the new packet flow is admitted on to the selected path if the maintained value for the type of the new packet flow is greater than the congestion measure of the selected path. Thus, paths with low congestion measures can have new flows admitted on to them, and hence load balancing across paths in the network occurs.

Another preferred embodiment further comprises maintaining, for the different types of packet flow, a respective value measure for each type of flow when carried by each path in the network, and wherein the selecting step comprises selecting a path which maximises excess path value, being the difference between the value of the flow to be admitted when carried by a path, and the congestion measure of that path. This allows the network operator to influence the path selection for different types of data flow, by setting different path values for different data types.

In the preferred embodiments the congestion measures are communicated to the ingress nodes, and the admission control decisions as to whether to admit a new packet flow to the network are performed at the ingress nodes. This reduces network signalling overhead, as the ingress nodes are the nodes at which flow admission requests are received, and hence the decision can be made at the node at which the requests are received.

In some embodiments different sets of value measures are maintained for different users, and/or different sets of value measures are maintained at different times of day. This allows the network operator to differentiate between different flows at different times and for different users.

In some embodiments of the invention the packet communications network is an Internet Protocol network. However, in other embodiments other network types may be used, such as, for example, an MPLS network, or an Ethernet. Other network types may also be used.

From another aspect the invention provides a gateway node in a packet communications network, the gateway node comprising: a first data store which maintains, for different types of packet flows, a respective value measure for each type of flow representing the value to the network operator of admitting a flow of each type to the network; a second data store storing, for substantially each path across the network from an ingress node to an egress node, a congestion measure relating to congestion on the paths caused by existing admitted packet flows; and an admission controller which admits a new packet flow to the network in dependence on the maintained value for the type of the new packet flow and the congestion measures determined for the paths across the network.

From a further aspect there is also provided a packet communications network, comprising a plurality of gateway nodes according to the previous aspect.

BRIEF DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:—

DESCRIPTION OF THE EMBODIMENTS

A first embodiment of the present invention will now be described with respect to FIGS. 3 to 5.

Figure 3:
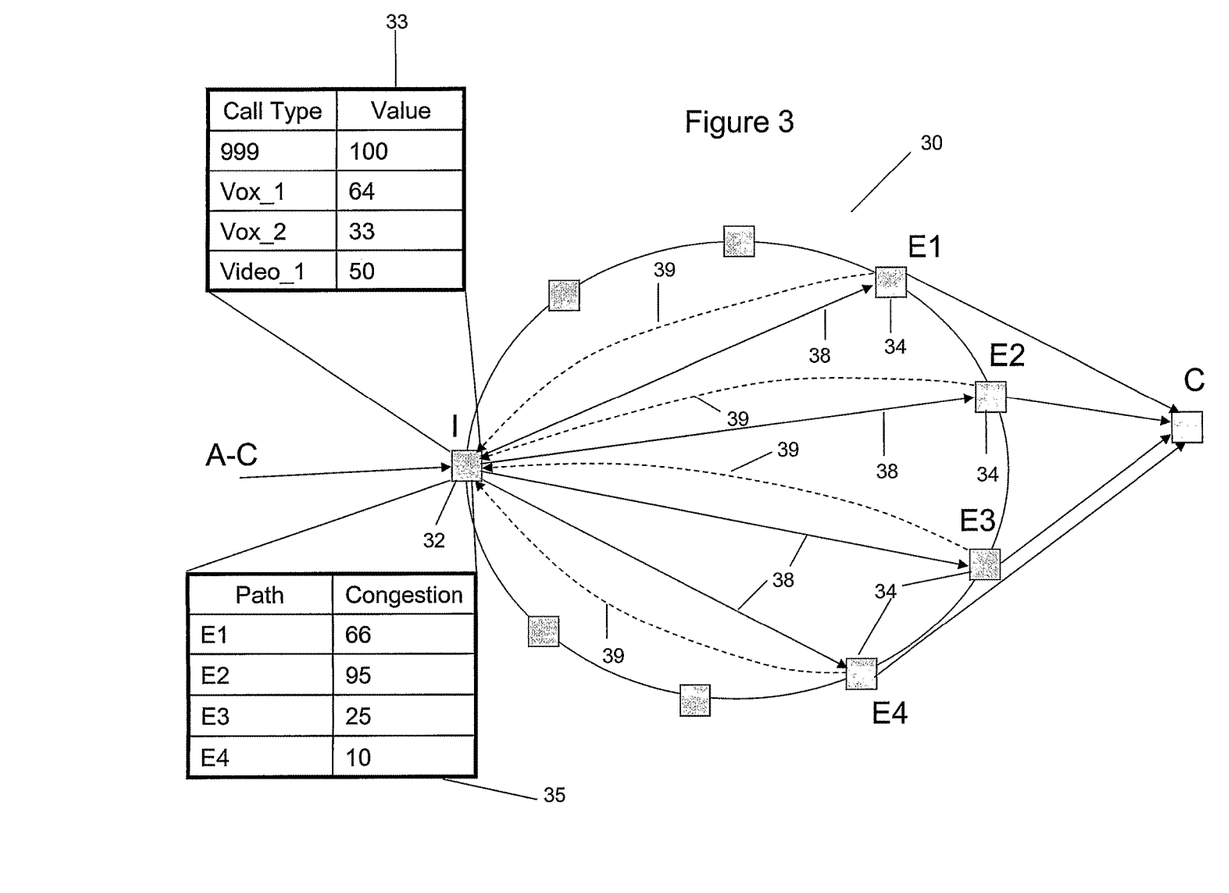
FIG. 3 is a diagram of a network having an admission control arrangement according to a first embodiment of the present invention.
Figure 4:
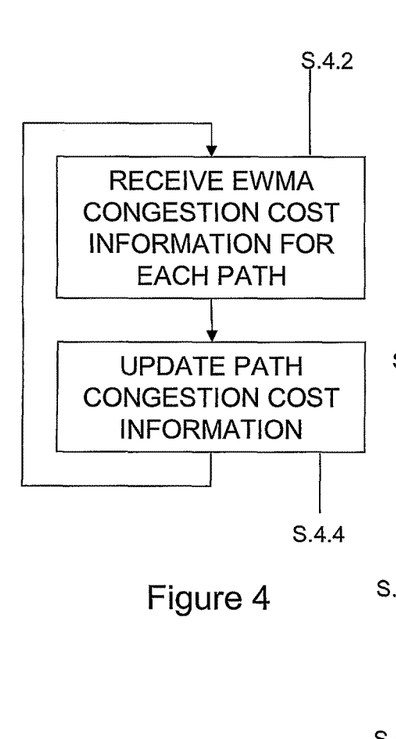
FIG. 4 is a flow diagram of the steps involved in one part of the admission control arrangement of the first embodiment of the present invention.

More particularly, FIG. 3 is a diagram of a network 30 which makes use of the admission control and routing arrangement of the first embodiment. The network 30 comprises a number of edge routers, such as ingress router 32, and egress routers 34. It should also be understood that the network 30 would also contain additional routers within the network, to provide hops within the network from edge router to edge router. These internal links are, however, not shown. In the example of FIG. 3, data flows from an ingress node I, 32, to egress nodes 34 (E1 to E4, via respective paths 38. As data flows along each path 38, at each node in the network along the path the data packets are marked in accordance with the current congestion level at that node. Typically this may be done using ECN or PCN, as discussed previously. Congestion marks are therefore generated in the network and flow to the egress gateways 34, where they are measured. Typically this might be done by computing an exponentially weighted moving average (EWMA) of the number of bytes in each congested packet on each path terminating at each egress gateway. The egress gateways 34 then continuously feed back this congestion information in the form of, for example, the EWMA measurement, to the relevant ingress gateways, in this example ingress gateway 32.

Each ingress gateway 32 also stores several sets of data. More particularly, in a first table ingress gateway 32 stores data relating to the particular "values" which the network operator is prepared to apply to different call types. Table 33 in FIG. 3 illustrates examples of call types, and non-limiting examples of the sorts of values which may be applied. Please note that in this example the value scale is arbitrary; in an actual implementation it would need to be related to the congestion scale obtained from the congestion measurements. Here, however, it can be seen that a 999 voice call is given a relatively high value of 100, whereas different types of voice calls, "vox_1" and "vox_2", are given different values. A video call "video_1" is again given a fourth value. Please note that the values may be configured in advance and fixed, or may, in other embodiments be regularly updated, by the network operator.

Each ingress node I, 32, also stores a table of congestion on different paths to egress nodes. Thus, table 35 shows how for each path from the ingress node to an egress node, identified by the egress node, a congestion cost value, based on the received congestion information, is maintained. Note that the values given in 35 are for example only, and are arbitrary. This congestion information is regularly updated, as shown by FIG. 4. That is, each ingress node 32 performs the procedure of FIG. 4, and updates the path congestion cost information every time it receives EWMA congestion cost information for each path. Thus, the congestion data stored in table 35 is up to date, and reflects the congestion cost of flows presently admitted into the network.

Here, it should be noted that the congestion cost measurements represent the cost to existing network users of admitting another flow into the network. The basic premise of the present embodiment is that admission control should operate to admit new flows into the network when the "value" of admitting that flow outweighs the congestion cost of admitting the flow. In this embodiment the congestion measure is a direct function of the amount of congestion at a link. However, if more high value calls are seeking admission to a link, then they will push the congestion cost higher than low value calls could (because the low value calls are preferentially rejected). Thus although the congestion costs are simple functions of congestion they also (at equilibrium) automatically reflect the value of the calls (actually the marginal value) congesting the link.

Figure 5:
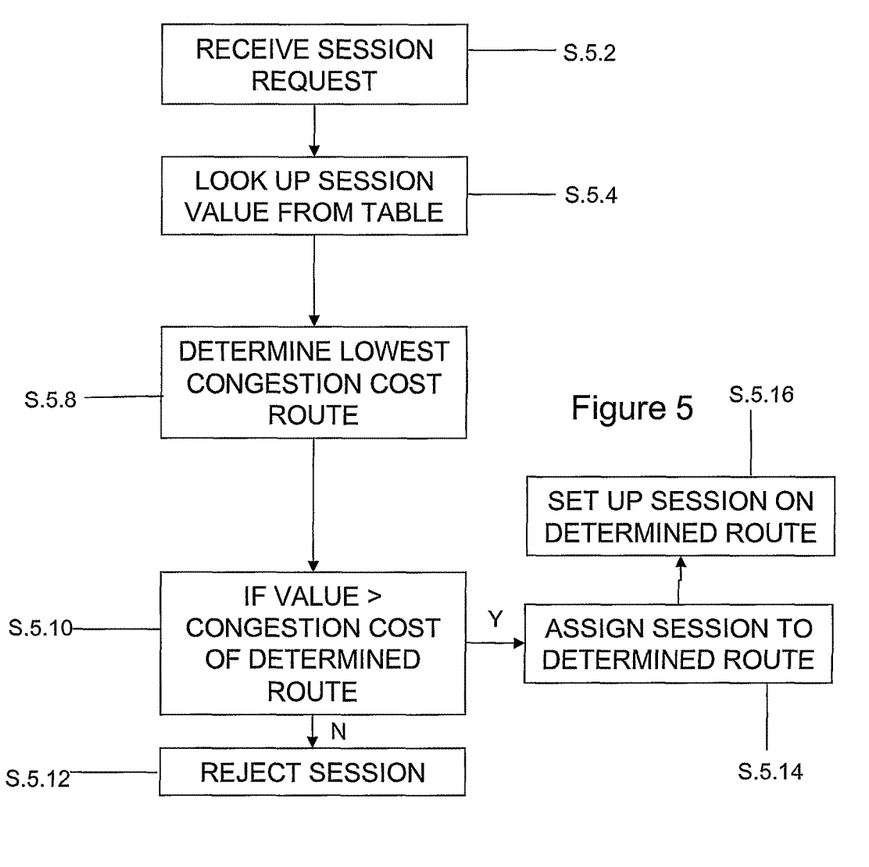
FIG. 5 is a flow diagram of the steps performed in another part of the admission control arrangement of the first embodiment of the present invention.

FIG. 5 illustrates the steps performed when an ingress node 32 receives a session request. More particularly, at step 5.2 the ingress node 32 receives a session request, and at step 5.4 it looks up the value of this particular type of session from the table 33. Thus, for example, if the session is a voice call of type "vox_1"; then the node knows that the network operator has assigned a (arbitrary) value of 64 to such a call type.

Now imagine that the received session request is to transport the session packets from source A to destination C. The ingress node 32 knows that to transport packets to destination C, any of paths 38 to any of egress nodes E1, E2, E3, or E4 can be used. Thus, there are several paths across the network 30 which can be used. At step 5.8, therefore, ingress node 32 looks at the congestion costs stored in table 35 for each route, and determines the lowest congestion cost route. In this example, this would be the route to egress node E4. Then, as a check, it determines whether the value of the session is greater than the congestion cost of the determined route, at step 5.10. If it is larger then at step 5.14 the session is accepted, and the ingress node assigns the session to the determined route i.e. in this case the path E4, and at step 5.16 performs the necessary control signalling to set up the session on the determined, route. On the other hand, however, if the value of the session is less than the present congestion costs of the determined route, the session is rejected, at step 5.12.

With such an arrangement then admission control and route selection are performed at the same time, as an integrated step. Additionally, because the embodiment is able to tailor the mix of session types it accepts depending on the congestion in the relevant resources, better use of the network is provided. For example, the invention will continue to admit high value sessions even when the network is too congested for low value ones. Additionally, the path selection algorithm always chooses the cheapest path, and hence the system is highly effective at balancing the load across resources, regardless of the topology of the network. Because congestion cost information is being fed back to the ingress nodes, additionally the routing algorithm is able to adapt to an efficient path allocation even after dramatic topology changes, such as in the case of network node failures.

In the first embodiment just described, the session values are set by the network operator, and are independent of the path chosen. However, in a second embodiment, to be described next, it is also possible for the value of the session to vary depending on the path chosen. Such an embodiment will be described next with respect to FIGS. 6 to 8.

Figure 6:
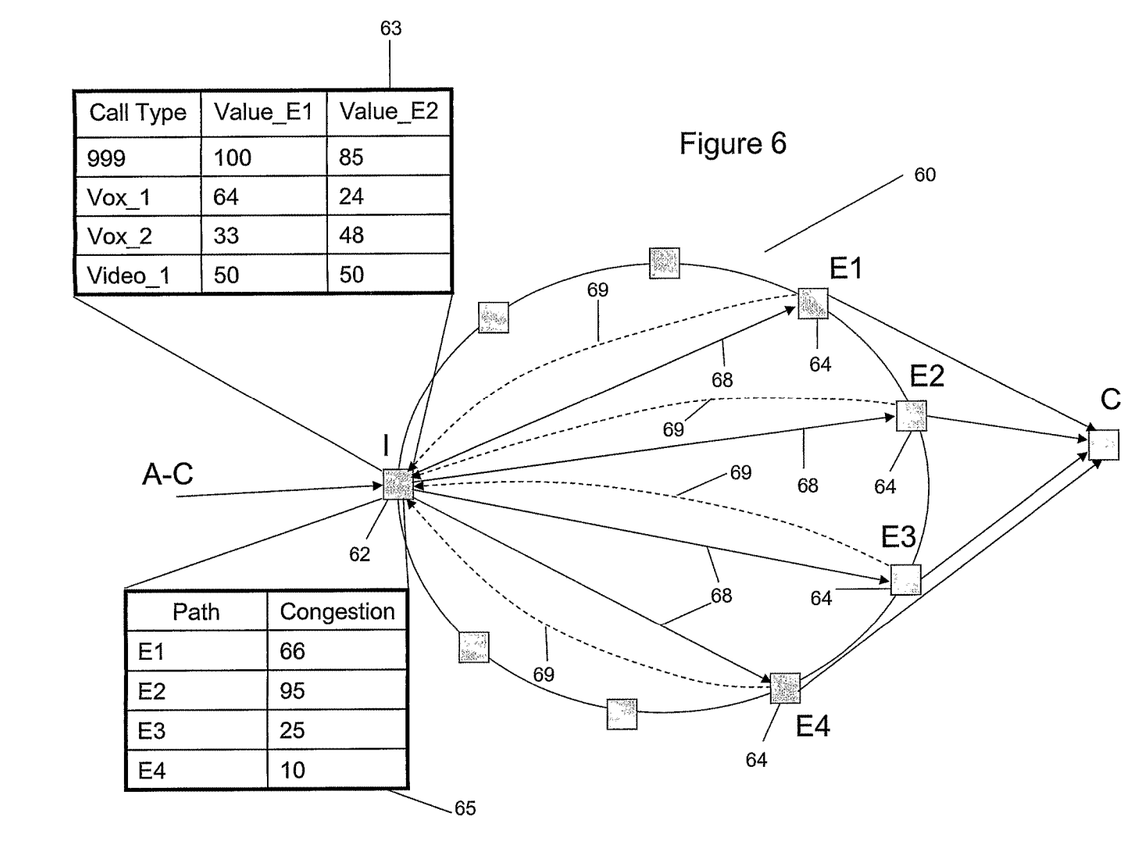
FIG. 6 is a diagram of a network incorporating an admission control and routing arrangement according to a second embodiment of the present invention.

More particularly, in FIG. 6 network 60 comprises a number of ingress and egress nodes 62 and 64. Paths are available from an ingress node 62 to egress node 64 across the network, and congestion cost information 69 is fed back from each egress node to the ingress node so as to communicate the congestion along each path. As in the previous embodiment, path congestion cost information is stored in a table 65, but in this embodiment indexed by each path.

Additionally, the ingress node 62 also stores a table of "values" for each type of session. However, unlike the first embodiment, where a single value was stored for each call type, in the second embodiment a number of values are stored for each call type, being one value for each possible path. In the example of FIG. 6 only two such values are shown for each call type, corresponding to paths E1 and E2, but it should be understood that as many values as there are paths from an ingress node to an egress node across the network may be provided.

Figures 7, 8:
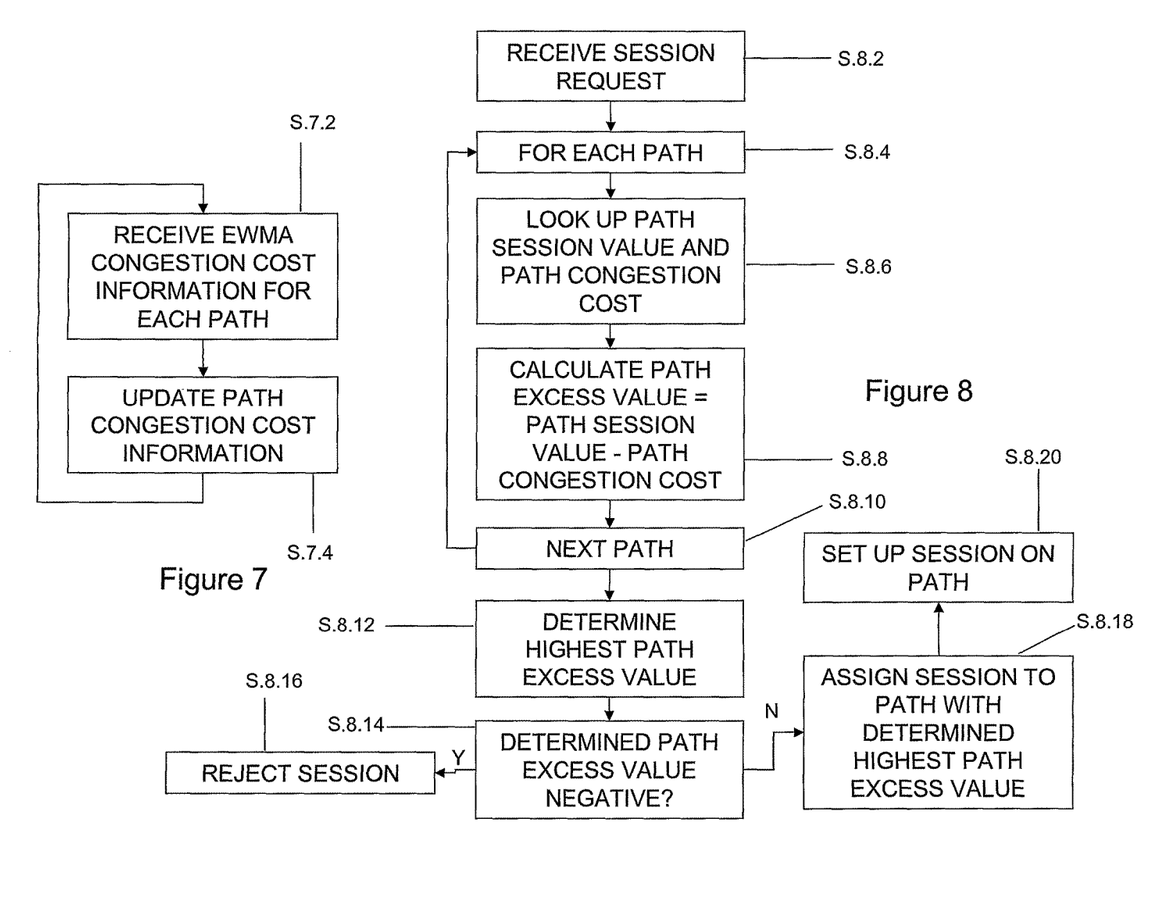
FIG. 7 is a flow diagram of part of the operation of the admission control and routing arrangement according to the second embodiment of the present invention.
FIG. 8 is a flow diagram of the steps involved in part of the admission control and routing arrangement according to the second embodiment of the present invention.

As in the first embodiment, the ingress node 62 continually updates the path congestion cost information in accordance with the procedure shown in FIG. 7, as the congestion cost information is provided from each egress node back to the ingress node. Thus, the information in table 65 is continually updated. However, in the second embodiment, how the congestion cost information is applied compared to the different values which are available for the same type of session will be described next with respect to FIG. 8.

More particularly, in the second embodiment assume that a session request is received at ingress node 62, at step 8.2. At step 8.4 the ingress node then begins to examine the congestion cost for each available path in turn. Here, for the sake of this example, assume that the session request is to transport packets from source A to destination C, and that paths to egress node E1, E2, E3, and E4 are therefore available. Each path is processed in turn, starting at step 8.4.

More particularly, for each path to the destination the path session value for the call type is looked up from table 63, and the path congestion cost from table 65. At step 8.8 a calculation is then performed to calculate the "path excess value", which is equal to the path session value from table 63 minus the path congestion cost from table 65. This calculation is performed for each path, such that the path excess value is found for each available path.

Next, at step 8.12, the highest path excess value is determined, and then at step 8.14, an evaluation is performed as to whether this path excess value is negative. A negative value would indicate the value of the requested session is less than the congestion cost, and hence the session would be rejected at step 8.16. If, however, the path excess value is not negative, then the session should be admitted, and this is performed at step 8.18, wherein the session is assigned to the path with the determined highest path excess value. At step 8.20 the ingress node then performs the necessary signalling to set up the session on the determined path.

The second embodiment of the invention presents the same advantages as the first embodiment, but adds the additional advantages that the network operator is able to influence the path selection to a greater degree, by assigning higher values for particular types of flow to go down particular paths. Thus, for example, where the network operator has installed equipment on a particular path which is optimised for a particular type of flow, then by assigning suitable high values for that call type onto that path, the operator can influence the path selection decision towards such a path.

In the above described first and second embodiments, congestion cost information is fed back to each ingress gateway, and admission control decisions are taken at each ingress gateway separately, when a session request is received at an ingress gateway. However, it is not necessary for the admission control decision to be performed at an ingress gateway, and instead, as to be described in a third embodiment, the admission control and path selection decision can be performed at a third entity, which we will refer to in this embodiment as a management subsystem. In particular implementations of the third embodiment, for example with networks which make use of the IP multimedia subsystem (IMS) defined, for example, in 3GPP TS 23.228 version 7.0.0, the management subsystem may, for example, be the service based policy decision functions (SPDF) contained within the network resource and admission control subsystem (RAGS). In wire line networks the RACS is the access resource and admission control function (A-RACF), which may be the management subsystem. In other networks, for example those based on ITU-T standards, the management subsystem could be the Resource Manager, whereas in networks according to standards generated by the MS Forum, it may be the bandwidth manager.

Figure 9:
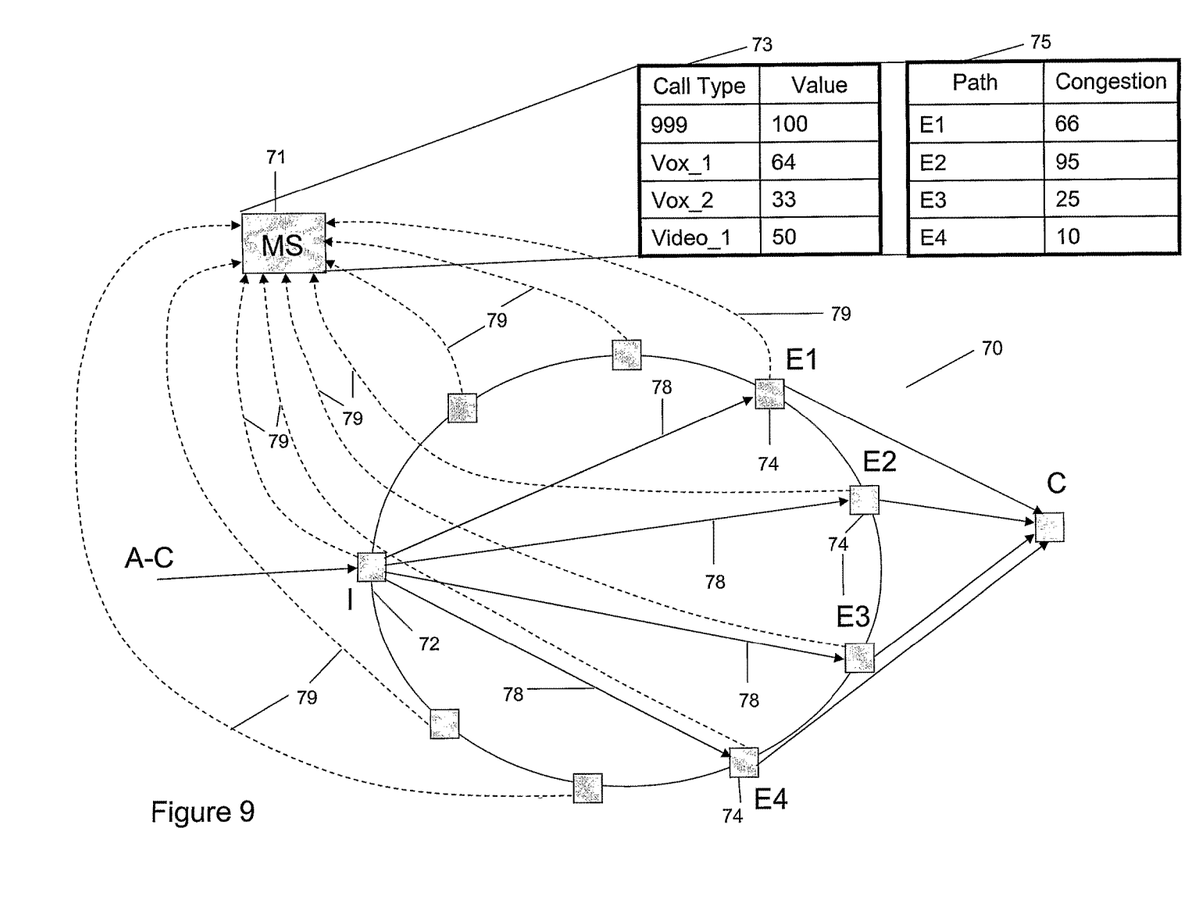
FIG. 9 is a diagram of a network which makes use of an admission control and routing arrangement according to a third embodiment of the present invention.

Whatever the actual management subsystem entity (and it will be understood that this depends on the network control model which is being used) typically, as shown in FIG. 9 a network 70 comprises a number of edge gateway routers, being ingress router 72, or egress routers 74 (it being understood that an ingress router for one flow may be an egress router for another flow) are provided. The network 70 also contains internal link nodes (which are not shown). From any particular ingress node 72 to a flow destination C, several paths across the network via different egress nodes may be used, as shown by paths 78, leading to egress nodes 74, E1 to E4. In this example, the paths to egress nodes E1 to E4 lead to destination node C, from ingress node 72.

In normal operation data flows across the links in the network via the path 78. Each link in the network (actually the node that manages the link) monitors its own congestion status, and signals that status to the management subsystem, via a congestion information signalling protocol, such as, for example, the well known simple network management protocol (SNMP).

The congestion cost information may be obtained at each gateway node in the same manner as in the previous embodiments. That is, as data packets in a data flow travel across the network from an ingress node to an egress node then when a packet experiences congestion at a link, the link router sets a congestion mark in the packet. As explained previously, congestion marking can be performed using Explicit Congestion Notification, which sets the bits of the DiffServ code points (DSCP) in the IP header, appropriately, depending on the congestion experienced. At an egress node the congestion markings in the packets arriving at the egress node are examined and a congestion measurement can be obtained relating to the congestion on a particular path along which a packet which arrives at an egress node has travelled. A congestion measurement may typically be obtained by computing an exponentially weighted moving average (EWMA) of the number of bytes in each congested packet on each path terminating at each egress gateway. The congestion information obtained at each egress node is fed back to the management subsystem 71, for use in the admission control decision.

Alternatively, individual routers both within the network and at the edge can signal load information relating to the present instantaneous loads on their links to the management subsystem and the management subsystem is then able to aggregate the information, and compute path congestion costs for every path, typically by adding up the load measurements for all links on a path, and knowing the link capacities.

The management subsystem 71 therefore stores a table 75 of respective paths in the network, and the congestion costs presently associated with each path. As shown in the example in FIG. 9, the management subsystem stores congestion cost information for each path from ingress node 72 terminating at egress node E1 to E4. Of course, in a typical implementation, the management subsystem would store many more paths than just those shown in this example, and in fact a congestion cost value would be stored for every path from each ingress node to each egress node across the network.

Additionally, the management subsystem stores, in table 70, a "value" figure for each call type which the network may be required to transport. In the same way as the first embodiment, the "value" of the call type indicates the value to the network operator of admitting the call to the network. In FIG. 9 it is shown in arbitrary units, but it should be understood that the actual stored values in an implementation would be in units which correspond to the congestion cost units which are stored for each path, such that a direct comparison of value to cost can be performed. As shown in FIG. 9 in table 73 several call types are stored, such as, for example, an emergency call (999, which is given an (arbitrary, in this example) value of 100, thus indicating that it is a relatively high value call. A voice call of type "vox_1" is given a value of 64, whereas a voice call of a second type, "vox_2", is given a value of 33. A video call of type "video_1" is given a value of 50. As in the first embodiment, different values can be applied for different types of sessions, or for the same type of session but for different customers. Additionally, the same type of session may have a different value applied at a different time of day. The values may be configured in advance, or may be routinely updated, by the network operator. Control of the values gives a large degree of control of the network to the network operator, as the network operator can influence which call types are admitted to the network.

Figures 10, 11:
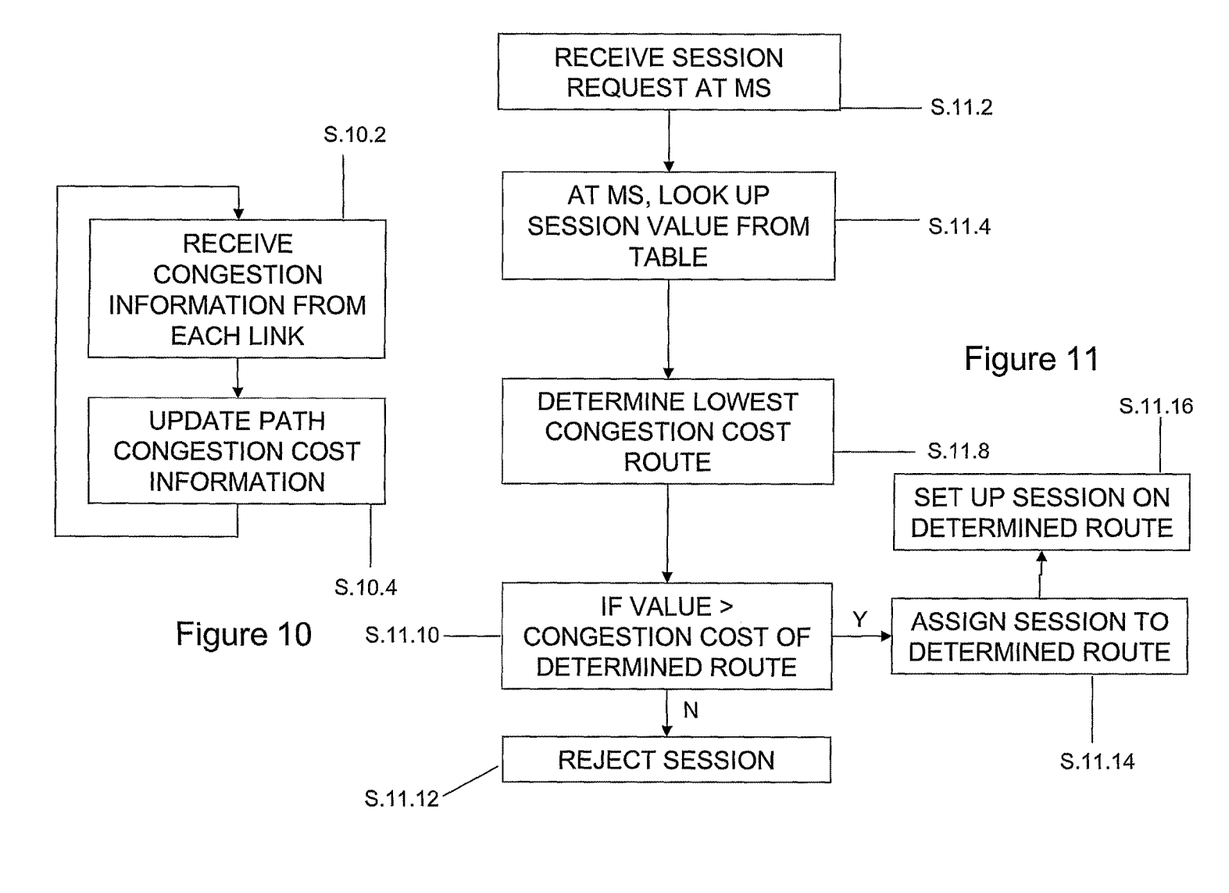
FIG. 10 is a flow diagram of part of the operation of the admission control and routing arrangement according to the third embodiment of the present invention.
FIG. 11 is a flow diagram according to another part of the operation of the admission control and routing arrangement according to the third embodiment.

Within the third embodiment, admission control and path routing is performed as shown in FIGS. 10 and 11. More particularly, FIG. 10 illustrates a continuous routine that runs on the management subsystem, wherein when congestion (or load) information is received from each link at step 10.2, then the path congestion cost information in table 75 is updated at step 10.4. This routine runs continuously, such that the management subsystem 71 can continually update the congestion costs stored in table 75 relating to each path in the network.

FIG. 11 illustrates the admission control and path selection procedure. A session request is received at the management subsystem 71, at step 11.2, to allow the management subsystem to perform the admission control decision, and routing decision. When the session request arrives at the management subsystem, at step 11.4, it looks up the session type in table 73, to determine the value of the session. Next, at step 11.8, the congestion costs stored in table 75 are examined, and those paths which are able to transport the packets of the requested flow towards its destination are examined so as to determine their congestion costs, and the path with the lowest congestion cost is selected. Next, at step 11.10, an evaluation is performed to determine whether the value of the requested session obtained from the look-up table 73 is greater than the congestion cost of the selected route, and if this is the case, then the flow should be admitted, wherein processing proceeds to step 11.4. Here, the requested session is assigned to the path with the determined lowest congestion cost, and at step 11.16 the management subsystem 71 makes the necessary control signalling to the ingress, egress, and link nodes of the network, so as to set up the requested session on the determined route.

If, on the other hand, at step 11.10 it was determined that the congestion cost of the determined route, which itself is the lowest congestion cost of all available routes for the flow, is still greater than the value of the requested flow, then the requested flow is not admitted, and the management subsystem 71 rejects the session, at step 11.12. Path selection and admission control decisions are communicated to the appropriate nodes in the network using the H.248 protocol, for example.

The third embodiment which makes use of the management subsystem outside of the network to perform the admission control and routing decision possesses the same advantages as the first embodiment described previously, but has a further advantage in that the admission control and routing decision can be performed at a single point in the network i.e. at the management subsystem. Thus, therefore, it is not necessary for each gateway router to have both the call session value table 73, as well as the path congestion information in table 75, as is required in the first and second embodiments. Instead, the management subsystem has oversight of all of the links in the network, and hence can store a single, master, path congestion cost table for all of the paths in the network. Additionally, because the admission control and route decision is performed centrally at the management subsystem, then only the management subsystem need store the call session value table. This makes it much easier for the network operator to update the call session values, as the update need only be performed at the management subsystem, rather than every gateway to the network. Similarly, in terms of network monitoring, the network operator can view congestion on each path in the network, from the path congestion cost information stored at the management subsystem.

Various modifications may be made to the above described embodiments to produce further embodiments, as described next.

For example, with respect to the congestion signaling which takes place within the network, as mentioned the congestion signaling is preferably ECN or PCN based. However, other embodiments of the invention are possible. ECN and PCN signal congestion using single bits in the IP header, piggybacked onto data packets sent downstream to the egress gateway. As an alternative, specialist management packets containing single bits acting as congestion marks may be sent downstream to the egress gateway.

It is also possible to use multi-bit values which could send more information though could not then be piggybacked on data packets. For example, multi-bit values may be written and accumulated in specialist congestion management packets, which are then sent downstream to the egress gateway. Alternatively, multi-bit values may be written and accumulated in management packets which are sent upstream to an ingress gateway, or alternatively, sent directly to the management subsystem, and accumulated there. In a further embodiment, multi-bit congestion values may be sent directly to all ingress gateways, and accumulated separately at each ingress gateway. This would allow each ingress gateway to have full knowledge of the congestion on every path in the network.

Furthermore, PCN and ECN measure congestion by looking at the length either of the real queue or a token bucket representing some form of a virtual queue. Other forms of congestion measurement are possible. For example, the link can measure load using some sort of windowed average and compare this to its capacity, for example by dividing the former by the latter. These measurements can then be sent as the multi-bit values referred to above.

There are also several choices as to where the admission control and path selection decision can be undertaken. In the first and second embodiments we described previously this was performed at the ingress gateway. In the third embodiment, the decision was performed at the management subsystem. It is possible in other embodiments, although these are not preferred, that the admission control and path selection decision could also be performed at an egress gateway, and the advantage of this is that it would not be necessary to communicate congestion information upstream to an ingress gateway. However, the admission control and routing decision would need to be communicated back upstream to an ingress gateway, but this may have less overhead than the continual communication of congestion information which is otherwise required. However, this depends upon the form of the congestion information, and the amount of network signalling which is required to communicate an admission control and path routing decision back from an egress gateway to an ingress gateway.

In terms of the congestion reporting back from an egress gateway to an ingress gateway, in the previously described embodiments we described how the congestion measurements were regularly and continuously reported back to the ingress nodes, or the management subsystem. However, in other embodiments the congestion measurement made at an egress node may be reported back to an ingress gateway or the management subsystem only on demand. Here, the ingress gateway or management subsystem would send a request packet to the egress gateway, which when received at the egress gateway causes the egress gateway to send a response packet containing the congestion cost information back to the ingress gateway (or the management subsystem). In a further embodiment, instead of the ingress gateway sending a specialist request packet, the egress gateway may respond to the receipt of congestion marks in specialist congestion management packets sent from the ingress gateway, such that whilst the egress gateway receives congestion marks, then it reports the congestion measurement back to the ingress gateways. However, when no congestion marks have been received, then no congestion reporting is required.

There are also several variations as to how the congestion cost measures may be calculated, and by which entities. In the embodiments described above a congestion measure calculated using the known ECN/PCN techniques is used, wherein an EWMA of the number of congested bytes is found, and communicated back. Congestion marking of packets at link routers in the network is also performed in accordance with ECN or PCN. However, in other embodiments different congestion measures may be used, calculated in different ways, and at different entities. For example, at its simplest, in one embodiment the congestion measure used may simply be a measure at an ingress gateway of the present load at that gateway. In other embodiments the measure may be a function of the present load and the link capacities of the gateway i.e. a more traditional "congestion" measure. In further embodiments loads and/or link capacity of other downstream links may also be taken into account, accumulated in one of any number of ways. It will be appreciated by the intended reader that the congestion measure of the present invention may be any function of the loads and/or capacities of the links and/or paths in the network.

The embodiments described above have been described generally in the context of being Internet Protocol (IP) networks, although it should be understood that the invention is not so limited, and in other embodiments of the invention other network protocols may be used. For example, the invention may also be used, in MPLS networks, as well as Ethernet networks, amongst others.

Further modifications, including additions, and/or deletions will be apparent to the person skilled in the art, and which may be made to the above described embodiments to provide further embodiments, any and all of which are intended to fall within the appended claims.

The invention claimed is:

1. A method of operating a packet communications network, the packet communications network having a network operator, the method comprising:

maintaining, for each of a plurality of different types of packet flow, a respective numerical value for said type of packet flow when carried by each path in the network, the numerical value for each type of packet flow being a predetermined value to the network operator of admitting a flow of said type of packet flow to the network, wherein the respective numerical value for said type of packet flow is set by the network operator;

determining, for each of a plurality of paths across the network, each path being a path for conveying packet flows from an ingress node to an egress node, a respective congestion measure relating to congestion on the respective path caused by existing admitted packet flows; and admitting a new packet flow to the network at an ingress node in dependence on the maintained numerical value for the type of the new packet flow and on the respective congestion measures determined for the respective paths across the network;

wherein congestion information is passed downstream along the respective paths towards their respective egress nodes, and wherein the congestion measure for each path terminating at a respective egress node is determined at the respective egress node from accumulated congestion information passed along said respective path;

wherein the admitting further comprises selecting a path onto which the new flow is to be admitted in dependence on the respective congestion measures determined for the respective paths across the network, such that flow admission control and path selection are performed in the same operation; and wherein the selecting comprises selecting a path that maximizes excess path value, being the difference between the numerical value of the flow to be admitted when carried by a path, and the congestion measure of that path.

2. The method according to claim 1, wherein the respective congestion measures are determined in dependence on congestion marks associated with packets in the packet flows.

3. The method according to claim 1, wherein the respective congestion measures determined at the respective egress nodes are communicated to the respective ingress nodes of the respective paths, and the admission control decisions as to whether to admit a new packet flow to the network are performed at the respective ingress nodes.

4. The method according to claim 1, wherein different sets of numerical values are maintained for different users.

5. The method according to claim 1, wherein different sets of numerical values are maintained at different times of day.

6. A gateway node in a packet communications network, the packet communications network having a network operator, the gateway node comprising:

a first data store configured to maintain, for each of a plurality of different types of packet flow, a respective numerical value for said type of packet flow when carried by each path in the network, the numerical value for each type of packet flow being a predetermined value to the network operator of admitting a flow of said type of packet flow to the network, wherein the respective numerical value for said type of packet flow is set by the network operator; and a second data store configured to store, for each of a plurality of paths across the network, each path being a path for conveying packet flows from an ingress node to an egress node, a respective congestion measure relating to congestion on the respective path caused by existing admitted packet flows;

wherein a new packet flow is admitted to the network at an ingress node in dependence on the maintained numerical value for the type of the new packet flow and on the respective congestion measures determined for the respective paths across the network;

wherein congestion information is passed downstream along the respective paths towards their respective egress nodes, and wherein the congestion measure for each path terminating at a respective egress node is determined at the respective egress node from accumulated congestion information passed along said respective path;

wherein a path onto which the new flow is to be admitted is selected in dependence on the respective congestion measures determined for the respective paths across the network, such that flow admission control and path selection are performed in the same operation; and wherein a path that maximizes excess path value is selected, the excess path value being the difference between the numerical value of the flow to be admitted when carried by a path, and the congestion measure of that path.

7. A packet communications network having a network operator, the packet communications network comprising:

a plurality of gateway nodes each comprising:

a first data store configured to maintain, for each of a plurality of different types of packet flow, a respective numerical value for said type of packet flow when carried by each path in the network, the numerical value for each type of packet flow being a predetermined value to the network operator of admitting a flow of said type of packet flow to the network, wherein the respective numerical value for said type of packet flow is set by the network operator; and a second data store configured to store, for each of a plurality of paths across the network, each path being a path for conveying packet flows from an ingress node to an egress node, a respective congestion measure relating to congestion on the respective path caused by existing admitted packet flows;

wherein a new packet flow is admitted to the network at an ingress node in dependence on the maintained numerical value for the type of the new packet flow and on the respective congestion measures determined for the respective paths across the network;

wherein congestion information is passed downstream along the respective paths towards their respective egress nodes, and wherein the congestion measure for each path terminating at a respective egress node is determined at the respective egress node from accumulated congestion information passed along said respective path;

wherein a path onto which the new flow is to be admitted is selected in dependence on the respective congestion measures determined for the respective paths across the network, such that flow admission control and path selection are performed in the same operation; and wherein a path that maximizes excess path value is selected, the excess path value being the difference between the numerical value of the flow to be admitted when carried by a path, and the congestion measure of that path.

8. The node according to claim 6, wherein the respective congestion measures are determined in dependence on congestion marks associated with packets in the packet flows.

9. The node according to claim 6, wherein the respective congestion measures determined at the respective egress nodes are communicated to the respective ingress nodes of the respective paths, and the admission control decisions as to whether to admit a new packet flow to the network are performed at the respective ingress nodes.

10. The node according to claim 6, wherein different sets of numerical values are maintained for different users.

11. The node according to claim 6, wherein different sets of numerical values are maintained at different times of day.

12. The method according to claim 1, wherein the respective congestion measures determined for the respective paths across the network comprise respective congestion measures for one or more paths across the network for conveying packet flows between the ingress node and egress node between which said new packet is to be conveyed if admitted.

13. The node according to claim 6, wherein the respective congestion measures determined for the respective paths across the network comprise respective congestion measures for one or more paths across the network for conveying packet flows between the ingress node and egress node between which said new packet is to be conveyed if admitted.

14. The node according to claim 6, wherein the first and second data stores are tables stored on the gateway node.

15. The node according to claim 6, wherein flow admission control and path selection are performed by the gateway node.

16. The node according to claim 6, wherein flow admission control and path selection are performed by a management subsystem.

17. The node according to claim 16, wherein the packet communications network is a 3GPP-defined or wire-line network, and wherein the management subsystem is a network resource and admission control subsystem (RACS).

18. The packet communications network according to claim 7, wherein the first and second data stores are tables stored to the respective gateway nodes.

19. The packet communications network according to claim 7, wherein flow admission control and path selection are performed by the respective gateway nodes.

* * * * *